(No Model.)
O. WILBANKS.
HOOF TRIMMING IMPLEMENT.
No. 547,703.  Patented Oct. 8, 1895.
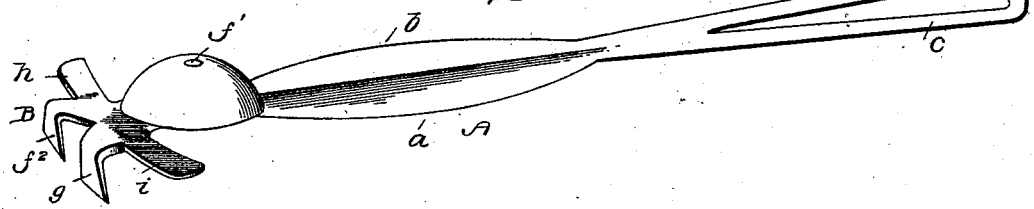
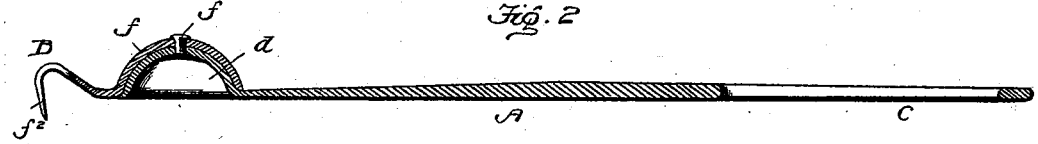
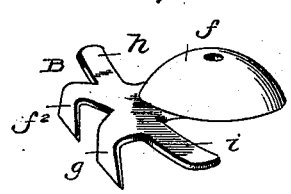
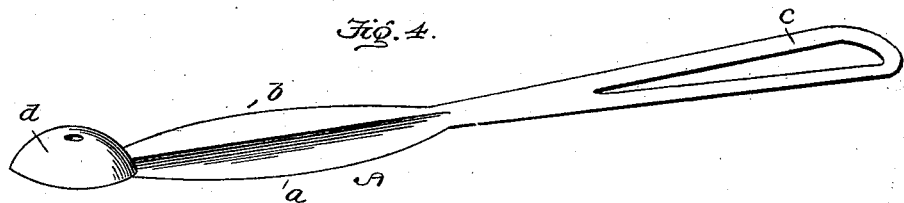
Witnesses
Oscar Wilbanks
Inventor
By Jas. H. Vermilya
Atty.

UNITED STATES PATENT OFFICE.

OSCAR WILBANKS, OF BLANCO, ARKANSAS.

HOOF-TRIMMING IMPLEMENT.

SPECIFICATION forming part of Letters Patent No. 547,703, dated October 8, 1895.

Application filed June 28, 1895. Serial No. 554,371. (No model.)

*To all whom it may concern:*

Be it known that I, OSCAR WILBANKS, of Blanco, county of Searcy, State of Arkansas, have invented a new and useful Improvement in Hoof-Trimming Implements, of which the following is a full, clear, and exact description, reference being had to the accompanying drawings, making part of this specification.

My invention relates to improvements in devices for use by farriers for trimming the hoofs of horses. In a device of this character it is important that the implement shall be so held and supported on the hoof that the operation of trimming or paring down the hoof may be accomplished in a uniform manner on both sides of the frog, so that the shoe may be applied in a perfectly level and true position. It is also desirable that the trimming implement shall be held steadily in place on the hoof, and at the same time be capable of being readily shifted or adjusted from one side of the hoof to the other side thereof. I aim to secure these objects by the construction of a trimmer or parer comprising a holder provided with hoof-engaging prongs, outwardly-extending leveling-arms, and a rounded socket-piece, in combination with a double-edged cutter provided with a handle at one end and at its other end with a rounded socket-piece, which fits snugly within the correspondingly-shaped socket-piece of the holder, and a pivot-pin extending through the rounded socket-pieces of the holder and the cutter-blade, all as will be hereinafter more fully described and claimed.

To enable others to more readily understand my invention I have illustrated the preferred embodiment thereof in the accompanying drawings, forming a part of this specification, and in which—

Figure 1 is a perspective view of my improved paring or trimming implement. Fig. 2 is a longitudinal sectional view thereof. Fig. 3 is a detail perspective view of the holder detached from the cutter-blade, and Fig. 4 is a similar view of the cutter-blade.

Like letters of reference denote corresponding parts in all the figures of the drawings.

A designates the cutter-blade, and B the holder, each constructed in a novel way and united pivotally together to form my improved implement for use by farriers in trimming or paring down the hoofs of horses to present a level surface for the application of the shoe in a manner to insure proper fitting of the shoe to the hoof. The cutter-blade is provided with curved side edges $a\ b$, and it is beveled from its median line to these curved edges to produce the keen cutting-edges on both sides of the blade, whereby the implement, when shifted from one side of the hoof to the other side thereof, may be used to always trim or pare the hoof from the frog or rear side toward the front side of the hoof. This mode of trimming the hoof has been found desirable, in that it enables the hoof to be trimmed uniformly on both sides and secures a level surface for the application of the shoe. At one end the blade A is formed into a suitable handle $c$ for the proper manipulation of the cutter, while the other end of the cutter-blade is formed with a rounded or partly ball-shaped boss $d$, which projects up from the surface of the blade, as shown by Fig. 4.

The holder B is in a single piece of metal, either of cast metal, wrought metal, or otherwise. The holder has a hollow semispherical or partly ball-shaped socket-piece $f$ of such dimensions as to snugly fit over the correspondingly-shaped boss $d$ of the cutter-blade, said rounded parts $d\ f$ of the cutter and holder being snugly fitted together, but capable of turning one within the other. These rounded parts $d\ f$ of the cutter-blade and the holder are pivoted together by the rivet or pin $f'$, which passes through openings formed in the parts $d\ f$, the ends of the rivet or pin being preferably swaged or headed down, as shown. These rounded parts $d\ f$, fitted and connected together in the manner shown and described, form a very steady and secure connection between the holder and the cutter-blade, which obviates any lateral vibration or play of the cutter-blade and insures an even steady motion to the blade when trimming or paring the hoof, which is an important advantage in a device of this character. The holder B is further provided with the angular prongs $f^2\ g$ and with the outwardly-extending leveling-arms $h\ i$, all being an integral part of the holder. The prongs $f^2\ g$ are curved or arched to fit snugly over the edge of the hoof and to press or bear against the outside thereof. The leveling-arms $h$ $i$ extend from opposite sides of the holder, and the inner faces or sides of these arms $h$ $i$ are flush with or raised slightly above the edges of the rounded parts $d$ $f$ of the holder and cutter-blade. These leveling wings or arms of the holder press or bear against the hoof, so as to maintain the holder in a level position on the hoof, and as said arms $h$ $i$ are pressed against the hoof they assist the prongs in maintaining the holder and the implement in position.

In operation the horseshoer lifts the foot until it is inverted, and the implement is then placed about one-half way between the toe and heel, so that the prongs fit over the edge of the hoof and the leveling-arms rest flat against the hoof. The operator then starts to cutting at the heel and pushes the blade gently around toward the toe of the hoof until the latter is pared from heel to toe on one side of the hoof. The implement is then removed and applied in a similar way to the opposite side of the hoof, and the blade is drawn gently along from the heel toward the toe until that side of the hoof is pared or trimmed to a level with the first side of the hoof.

By the use of my implement in the manner described both edges of the blade are brought into use and the hoof is always trimmed from the heel toward the toe. The implement is held in a perfectly flat position against the hoof, and as the cutter-blade cannot play or vibrate the hoof can be easily and quickly trimmed to a perfectly flat level condition, which is best adapted for the application of the shoe to the hoof.

I am aware that slight changes in the form and proportion of parts and in the details of construction may be made by a skilled mechanic without departing from the spirit or sacrificing the advantages of my invention.

Having thus fully described my invention, what I claim as new, and desire to secure by Letters Patent, is—

1. A hoof trimming or paring implement, substantially such as herein shown and described, comprising a cutter-blade having a rounded boss, a holder formed with angular and curved prongs, leveling-arms, and a rounded socket-piece into which the rounded boss of the cutter-blade is snugly fitted, and a pivot connecting the rounded boss and the socket-piece, as and for the purposes described.

2. A hoof paring or trimming implement, comprising a holder made in a single piece with the partly ball-shaped socket, the hook-shaped prongs, and the outwardly-extending leveling arms, a double-edged cutter blade provided with the rounded boss which is fitted snugly into the socket, and a pivot connecting the rounded boss of the cutter-blade to the rounded socket-portion of the holder, all arranged and adapted for operation in the manner and for the purposes described.

In testimony whereof I have hereunto set my hand this 17th day of June, A. D. 1895.

OSCAR WILBANKS.

Witnesses:
F. J. TENISON,
R. L. RUSSELL.